Patented Sept. 21, 1954

2,689,863

UNITED STATES PATENT OFFICE 2,689,863

ESTER-ANHYDRIDES AND THE PRODUCTION THEREOF

Aubrey E. Broderick, South Charleston, W. Va., and Charles R. W. Morison, Glenshaw, Pa., assignors, by mesne assignments, to Union Carbide and Carbon Corporation, a corporation of New York No Drawing. Application October 7, 1948, Serial No. 53,384

16 Claims. (Cl. 260—468)

This invention relates to the production of novel adducts of acetic anhydride and monoesters of dicarboxylic acids in the form of esteranhydrides of carboxylic acids, which adducts possess especial utility in the production of plastic compositions having a basis of cellulose mixed esters and ether-esters. The invention also concerns a novel process for making such adducts or ester-anhydrides; and the use of such adducts in the production of internally plasticized cellulose mixed esters.

Cellulose esters and mixed esters of monocarboxylic acids, such as cellulose acetate and cellulose acetate-butyrate have been in wide use for many years for a variety of purposes, including the production of molded articles, sheeting, films, lacquers, adhesives, rayon textiles, etc. Such cellulose esters usually are manufactured by esterifying one or more hydroxyl groups of cellulose or hydrated cellulose derivatives by means of organic acid anhydrides or acid chlorides. In recent years modified cellulose acetates in which a selected amount of the acetic acid group in the molecule has been replaced with a higher fatty acid group, such as the propionic and butyric acid group, have been developed and found to possess special properties rendering them commercially valuable. Such mixed esters, although somewhat more plastic and workable at temperatures normally used in the fabrication and during the use of articles made therefrom, require the use of plasticizers in order to prepare compositions which readily can be molded.

The present invention is based in part upon the discovery that by reacting monoesters of dicarboxylic acids with acetic anhydride, either in the absence or the presence of an esterification catalyst, ester-anhydrides of carboxylic acids are produced which are useful as agents for the production of mixed esters and ether-esters of cellulose derivatives wherein the residue of such ester anhydride evidently functions in part as an internal plasticizer and in some instances makes possible the use of the cellulose ester as a molding composition without the need for further plasticizers.

Among suitable monoesters of dicarboxylic acids useful in the process are the aliphatic and aromatic monoesters of saturated and unsaturated aliphatic and aromatic dicarboxylic acids, among which are the methyl, ethyl, isopropyl, n-butyl, 2-ethyl butyl, phenyl, benzyl, cyclohexyl, ethoxyethyl, methoxyethyl, phenoxyethyl, methoxyethoxyethyl and phenoxyethoxyethyl monoesters of the following acids: oxalic, malonic, succinic, glutaric, adipic, pimelic, sebacic, phthalic, fumaric, maleic, citraconic, mesaconic, itaconic and endomethylene hexahydrophthalic acids.

The ester anhydrides of the invention may be defined as monocarboxylic acid anhydrides having the formula

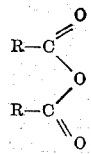

wherein each R designates a radical selected from the class consisting of the esterified (1) carboxyl, (2) carboxyalkyl, (3) carboxyalkenyl, (4) carboxycycloalkyl, (5) carboxyaryl and (6) carboxyaralkyl radicals.

According to the invention, these ester anhydrides can be produced in good yields and in simple manner from available or readily producible materials by reacting acetic anhydride with a monoester of a dicarboxylic acid at elevated temperatures, preferably in the absence of any added ester exchange catalyst, although strong mineral acids or other esterification catalysts may be present. The reaction temperature is maintained sufficiently low that, under the conditions of pressure employed, the acetic anhydride is not distilled off. Preferably the acetic acid produced in the reaction is removed by distillation as formed. By conducting the reaction uncatalyzed, the resultant product is better suited for use in the production of cellulose mixed esters and ether-esters.

The reaction mixture is fractionally distilled under vacuum for the removal of the acetic acid and unreacted starting materials, and the residual product may be purified, or it may be employed successfully in the cellulose ester production in the unpurified state.

The principal reaction involved in the ester-anhydride production may be illustrated by the following equation relating to the reaction of acetic anhydride and monomethyl succinate to form the anhydride of 3-methylcarboxyl propionic acid:

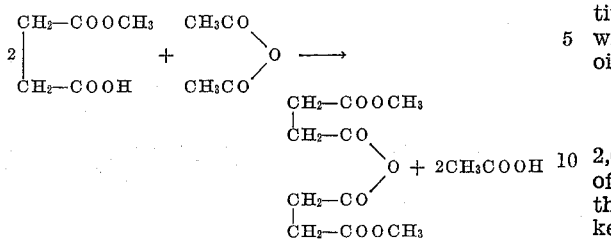

The monoesters of dicarboxylic acids used as starting materials readily can be made in known manner, as by reacting a dicarboxylic acid anhydride with an excess over a molar equivalent of a monohydric aliphatic or aromatic alcohol, or with a monoalkyl or monoaryl ether of a dihydric aliphatic alcohol, as illustrated by the equation for the reaction between succinic anhydride and methanol:

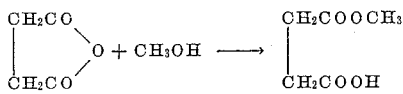

and fractionally distilling the resultant reaction mixture under vacuum.

The following examples illustrate the production of useful anhydrides of acyloxy carboxylic acids of the invention. In the examples, all parts are in terms of weight unless otherwise stated.

*Example 1*

2,080 parts of 98% acetic anhydride were reacted with the quantity of monomethyl succinate made by reacting 2,000 parts of succinic anhydride with 640 parts of methanol for somewhat less than one hour, and thereafter adding 640 parts of methanol and refluxing for one hour at a kettle temperature of 89° C. The excess methanol then was removed by distillation under vacuum to a kettle temperature of 90° C. under 28 mm. pressure.

The mixture of acetic anhydride and monomethyl succinate was heated at 100° C. for thirty minutes, and then cooled to room temperature. The acetic acid and excess acetic anhydride then were distilled off with a final distillation head temperature of 54° C. under 21 mm. of mercury pressure. The pressure then was reduced and several fractions containing succinic acid removed. The main fraction containing the desired ester-anhydride distilled at 167° C.–181° C. under 1.5 mm. pressure. Upon redistillation, the fraction containing the anhydride of 3-methylcarboxyl propionic acid boiled at 156° C.–159° C. under 2–3 mm. pressure. It had a molecular weight of 248.7, compared with a theoretical molecular weight of 246. It was a colorless oily liquid.

*Example 2*

To 2,825 parts of monoethyl succinate were added 1,130 parts of 98% acetic anhydride (which includes a 10% excess of the anhydride). The temperature was slowly raised to 110° C. during three hours while refluxing under a vacuum of 40–50 mm. of mercury. The reaction mixture then was distilled under vacuum commencing at 57° C. under 78 mm. pressure and ending at 35° C. under 8 mm. pressure, thereby removing acetic acid and unreacted acetic anhydride. There was a conversion of around 90% based on recovered acetic acid. The anhydride of 3-ethylcarboxyl propionic acid was recovered as a residue having a molecular weight of 273.8 (based upon alkaline titration of the ester-anhydride) as compared with a theoretical value of 274. It was a colorless oily liquid with a characteristic anhydride odor.

*Example 3*

Monobutyl succinate was made by reacting 2,000 parts of succinic anhydride with 1,620 parts of n-butanol at 100° C.–120° C. for 21 hours, and thereafter distilling the reaction mixture to a kettle temperature of 130° C. under 7 mm. pressure for removal of excess butanol.

2,820 parts of the resultant monobutyl succinate were reacted with 910 parts of acetic anhydride (a 10% excess). The reaction mixture was distilled to a final kettle temperature of 126° C. under 7 mm. of mercury pressure; and the residue was distilled under high vacuum in a molecular type still at 70° C.–75° C. under 0.003 mm. of mercury pressure—the kettle temperature increasing from 103° C. to 175° C. The still residue contained 70% of the anhydride of 3-butylcarboxyl propionic acid in the form of a colorless oily liquid. This ester anhydride was used effectively in the preparation of a mixed ester of hydroxypropyl cellulose. (See Example 17.)

*Example 4*

A mixture of 98.3 parts of the monoethyl ester of endomethylene hexahydrophthalic acid and 29.8 parts of 95% acetic anhydride (a 20% excess) was distilled under vacuum up to a kettle temperature of 200° C. under 78–80 mm. pressure while removing acetic acid and excess acetic anhydride. The distillation residue was filtered, and contained a fair yield of the acid anhydride of the monoethyl ester of endo-methylene hexahydrophthalic acid in the form of an oily liquid having the apparent structure:

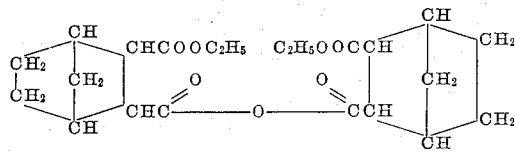

*Example 5*

3,430 parts of monoethyl adipate were mixed with 1,164 parts of 95% acetic anhydride and, after standing overnight, the mixture was fractionally distilled at a kettle temperature of from 54° C. under 18 mm. pressure to 127° C. under 5 mm. pressure, to remove acetic acid and any excess acetic anhydride. The reaction mixture was filtered, and the filtrate contained 81% anhydride calculated as the anhydride of 5-ethylcarboxyl valeric acid in the form of a tan, oily liquid soluble in acetone, isopropyl ether, acetic acid and acetic anhydride.

The monoethyl adipate was made by adding to 2,784 parts of adipic anhydride 921 parts of ethanol (a 5% excess) in small successive portions during two hours with cooling, and then removing excess ethanol by vacuum distillation to a kettle temperature of 120° C. under 7 mm. pressure.

The adipic anhydride was made by reacting 3,000 parts of adipic acid with 2,428 parts of 95% acetic anhydride, and distilling the reaction mixture to 133° C. under 5 mm. pressure to remove the acetic acid and unreacted acetic anhydride.

Example 6

500 parts of monobenzyl phthalate of 98.3% purity were reacted for 2.5 hours with 116 parts of acetic anhydride (a 10% excess over equimolar proportions) during which time the reaction mixture was distilled slowly under vacuum at kettle temperatures ranging from 96° C. under 80 mm. pressure to 126° C. under 9 mm. pressure, thereby eliminating the acetic acid and excess acetic anhydride. The still residue was the acid anhydride of o-benzyl benzoic acid having a purity of about 82%.

Monobenzyl phthalate can be prepared by heating one mol of benzyl alcohol with one mol of phthalic anhydride at refluxing temperature. (See Beilstein's Organic Chemistry, vol. IX, page 802.)

Example 7

580 parts of monobutyl maleate and 214 parts of acetic anhydride of 95% purity were mixed, heated and slowly distilled under vacuum at kettle temperature ranging from 82° C., under 44 mm. pressure to 102° C. under 5 mm. pressure, to eliminate the acetic acid and the excess acetic anhydride. The residual product contained 83.6% of anhydride as the anhydride of 3-butylcarboxyl acrylic acid, in the form of a deep yellow oily liquid soluble in acetone, isopropyl ether, acetic acid and acetic anhydride.

The monobutyl maleate was made by reacting 273 parts of n-butanol and 343 parts of maleic anhydride at 95° C.-111° C. for 3.5 hours, and was used without removal of excess butanol.

Example 8

To 795 parts of monocyclohexyl succinate were added 235 parts of 95% acetic anhydride (a 10% excess) and the resultant mixture was reacted and slowly distilled under vacuum at kettle temperatures ranging from 102° C. under 75 mm. pressure to 139° C. under 8 mm. pressure while removing acetic acid and excess acetic anhydride. The residual product was the anhydride of 3-cyclohexylcarboxyl propionic acid of 90.2% purity, in the form of a colorless oily liquid, soluble in acetone, isopropyl ether, acetic acid and acetic anhydride.

Example 9

629 parts of the monomethoxyethoxyethyl ester of succinic acid were reacted with 170 parts of 95% acetic anhydride (which includes a 10% excess) and slowly distilled for 3.3 hours under vacuum at kettle temperatures ranging from 100° C. under 77 mm. pressure to 119° C. under 7 mm. pressure, to remove acetic acid and excess acetic anhydride. The distillation residue contained 43.4% anhydride, calculated as the anhydride of 3-methoxyethoxyethylcarboxyl propionic acid, and 42.4% of the corresponding acid.

Example 10

To 617 parts of crude monoisopropyl maleate were added 247 parts of 95% acetic anhydride, and the mixture was slowly heated in a still for 5.5 hours under vacuum at a kettle temperature ranging from 80° C. under 52 mm. pressure to 104° C. under 4 mm. pressure, and a still head temperature ranging from 42° C. at 52 mm. pressure to 30° C. under 4 mm. pressure, thereby removing low boiling compounds including acetic acid, and excess acetic anhydride. The distillation residue contained 91.2% of 3-isopropylcarboxyl acrylic acid anhydride in the form of a deep yellow oily liquid, soluble in acetone, isopropyl ether, acetic acid and acetic anhydride.

The crude monoisopropyl maleate was made by heating a mixture of 400 parts of maleic anhydride and 128 parts of isopropanol to about 95° C. for one hour, then adding 129 parts of isopropanol in two equal portions 30 minutes apart while maintaining the mixture at 100° C.-120° C. for 6.5 hours. The molecular weight of the monoester was 152.8, compared with the theoretical value of 158.

Example 11

A mixture of 541 parts of monobenzyl succinate and 152 parts of 95% acetic anhydride was slowly reacted by distilling under vacuum for 2.25 hours while maintaining a kettle temperature within the range from 36° C. under 72 mm. pressure to 133° C. under 11 mm. pressure, and a head temperature within the range from 54° C. to 30° C. The acetic acid and the excess acetic anhydride thus were distilled off. The residue was filtered through powdered carbon. The filtered residue contained 87.2% of anhydride as the anhydride of 3-benzylcarboxyl propionic acid in the form of a colored oily liquid.

The monobenzyl succinate was made by heating a mixture of 300 parts of benzyl alcohol and 276 parts of crude succinic anhydride successively for about 32 hours at 163° C.-200° C.

Example 12

160 parts of monoethyl oxalate and 77 parts of acetic anhydride (including a 10% excess) were reacted for about two hours at 79° C.-100° C. The resultant reaction mixture was distilled under vacuum at kettle temperatures ranging from 79° C. to 100° C., and pressures ranging from 44 mm. to 4 mm. of mercury, thereby removing acetic acid and excess acetic anhydride. The residual product contained 89% anhydride, calculated as the anhydride of ethylcarboxyl formic acid.

In similar manner, the reaction of acetic anhydride with monoisopropyl succinate yields 3-isopropylcarboxyl propionic acid anhydride; that with monobutyl malonate yields 2-butylcarboxyl acetic acid anhydride; that with monoisopropyl glutarate yields 4-isopropylcarboxyl butyric acid anhydride; that with monoethyl pimelate yields 6-ethylcarboxyl hexylic acid anhydride; that with monoethoxyethyl succinate yields 3-ethoxyethylcarboxyl propionic acid anhydride; that with monophenoxyethyl succinate yields 3-phenoxyethylcarboxyl propionate acid anhydride; and that with monophenyl succinate yields 3-phenylcarboxyl propionic acid anhydride.

The ester anhydride compositions of the invention are useful in the production of novel mixed esters of cellulose by reacting cellulose or various hydroxyl-containing cellulose derivatives, such as the cellulose ethers, e. g., hydroxyethyl celluloses and hydroxypropyl celluloses that have been wetted by glacial acetic acid, with a mixture of acetic anhydride and an ester-anhydride of this invention, in the presence of an esterification catalyst such as sulfuric acid, hydrochloric acid or other mineral acid, while maintaining the reaction mixture not higher than 50° C. and preferably around 25° C.-35° C. The acetic anhydride and the ester anhydride conveniently may be added in increments to the cellulose derivatives for better control of the esterification.

After the reaction mixture has been converted to a more or less homogeneous solution, the mixed cellulose ester thus produced is precipitated from the solution by treatment with a suitable precipitant such as diisopropyl ether or diethyl ether. The cellulose ester then is washed successively with diisopropyl ether, cold methanol and water until neutral, and then is dried.

The following examples illustrate the use of these ester anhydrides in the production of mixed ether-esters of cellulose, all parts being given by weight.

*Example 13*

Hydroxypropyl cellulose containing about 6% of combined propylene oxide was prepared by heating and reacting for about 12 hours in an autoclave at 100° C. under self-induced pressure a dispersion of one part by weight of wood pulp or cotton linters in about 10 parts by weight of liquid propylene oxide and a small amount (around 1%) of trimethyl benzylammonium hydroxide as catalyst. The cellulose ether was cooled, separated from the reaction mixture by centrifuging, washed with water containing a trace of acetic acid, bleached with sodium hypochlorite, again washed with water, and dried in air at 60° C.–70° C.

409.2 parts of the air-dry hydroxypropyl cellulose were steeped overnight in enough glacial acetic acid to cover it, and then was pressed to a weight of 900 parts. This was added during 20 minutes with agitation to a mixture of 3,785 parts of 3-ethylcarboxyl propionic anhydride produced in accordance with Example 2, 156 parts of 98% acetic anhydride and 15 parts of 95% sulfuric acid in a stainless steel jacketed autoclave while maintaining the temperature between about 25° C. and 35° C. After 12 hours, 3 parts of acetic anhydride, 946 parts of ethylcarboxyl propionic anhydride and about 4 parts of 95% sulfuric acid were added; and 4 hours later 3 parts of acetic anhydride, 946 parts of the said ester anhydride and 9.2 parts of 95% sulfuric acid were added. The reaction was completed in a total of 20 hours. The cellulose mixed ester was precipitated from the solution and hardened by treatment with 10,161 parts of diisopropyl ether, and the precipitated ester was extracted successively with isopropyl ether and with cold methanol, and then heated successively with methanol and magnesium acetate, with water and magnesium acetate, and with water until free from acidity, and then was dried. A yield of cellulose mixed ester was secured equivalent to 198% of the cellulose ether esterified. The molar ratio of combined acetic acid to combined ethylcarboxyl propionic acid in the cellulose ester was 37:63.

This cellulose ester was readily milled without an added plasticizer at a temperature of 130° C.–140° C. It was successfully compression molded at 170° C., and had a heat distortion temperature of 90° C. (It is significant to note that cellulose acetate, either as a primary or secondary ester, cannot be milled or molded without a plasticizer.)

The primary cellulose mixed ester thus made was soluble in acetone and, on partial hydrolysis, became less soluble in acetone as the hydrolysis proceeded. This is in striking contrast to the action of cellulose acetate.

*Example 14*

To 874 parts of air dry hydroxypropyl cellulose containing about 6% of combined propylene oxide were added sufficient glacial acetic acid to cover and the mixture was steeped overnight, and centrifuged to a weight of 1,392 parts. Over a period of 20 minutes this mixture was added to a charge of 6,390 parts of 98.9% methylcarboxyl propionic anhydride produced in accordance with Example 1, and 1,000 parts of 98% acetic anhydride, and 29 parts of sulfuric acid, while maintaining the temperature between 12° C. and 25° C. The mixing was continued for 20 hours during which 2,000 additional parts of methylcarboxyl propionic anhydride, 3,000 parts of glacial acetic acid and 6 parts of 95% sulfuric acid were added. After 20 hours the resultant cellulose ester was precipitated from the reaction mixture with diisopropyl ether, the product was extracted successively with diisopropyl ether, cold methanol and water until free of acidity and was dried, yielding 1,623 parts of the cellulose ester corresponding to 195.5% of the weight of the original cellulose ether. This cellulose ester was stabilized by boiling in a mixture of acetone and water containing magnesium acetate. It had good heat stability, and was milled at 130° C.–140° C., and compression molded at 175° C. with 2% of methyl phthalyl methyl glycolate as plasticizer. In contrast therewith, cellulose acetate requires 25%–30% of this plasticizer for successful molding. The molar ratio of combined acetic acid to combined methylcarboxyl propionic acid in the ester was 58.5:41.5. Unlike cellulose acetate, this triester is soluble in acetone, and a partial (2%–3%) hydrolysis results in decreased solubility in acetone.

*Example 15*

21.2 parts of air-dry hydroxypropyl cellulose having a molecular weight of 173 on the basis of one glucose anhydride unit were steeped overnight with sufficient glacial acetic acid to cover it. The mixture was filtered, and the cellulose ether pressed to a weight of 61.2 parts, cooled to 0° C., and mixed with 226.2 parts of 75% acid anhydride of the monoethyl ester of endo-methylene hexahydrophthalic acid, 128.4 parts of 98% acetic anhydride and 1.5 parts of 95% sulfuric acid with cooling. After reacting the mixture for about seven hours at about 26.8° C.–38° C., the resultant ester was precipitated from the reaction mixture with isopropyl ether, and purified by dissolving in acetone and reprecipitating therefrom with water containing a trace of magnesium acetate. A solution thereof in a mixture of ethylene dichloride and anhydrous ethanol (75:25 by volume) containing magnesium ethylbutyrate and a small amount of water was refluxed for several hours, filtered, and the ester precipitated with hot water, washed and dried.

This ester had improved heat stability, and films made from it were strong and had superior moisture resistance. The ester was milled and molded at 170° C. without a plasticizer, yielding a brittle molded product.

The anhydride of the monoethyl ester of endo-methylene hexahydrophthalic acid used in making the hydroxypropyl cellulose ester was made in the manner described in Example 4.

*Example 16*

25 parts of dry hydroxypropyl cellulose having a molecular weight of 173 on the basis of one glucose anhydride unit were covered with glacial acetic acid and steeped overnight, then filtered, and the residue pressed to a weight of 65.5 parts. To this cellulose ether was added with stirring a solution of 449 parts of a mixture containing 81.5% of the anhydride of o-ethylcarboxyl benzoic acid (the balance being mainly phthalic anhydride), 104.8 parts of 98% acetic anhydride and 1.5 parts of 95% sulfuric acid, while maintaining the reaction mixture at 21° C.-32° C. After 8 hours a clear dope was obtained which was stored overnight, and the cellulose ester was precipitated with isopropyl ether. The precipitate was extracted with cold isopropyl ether and then, successively, with methanol, with hot water containing magnesium acetate, and with cold water. The product was dried at 70° C. to a weight of 43.7 parts. The dried product was soluble acetone. A solution thereof in ethylene dichloride-anhydrous ethanol (60:40 by volume) was refluxed 6 hours with 5 parts magnesium acetate and 20 parts water, then filtered, precipitated, extracted with hot water and dried at 70° C. This product had a combined organic acid content equivalent to the esterification of 92.5% of the available hydroxyl groups with acetic acid and of 7.5% thereof with the anhydride of o-ethylcarboxyl benzoic acid. This product had good heat stability on heating at 180° C. for 3 hours in air. It was converted to films of good flexibility and clarity, and with good moisture resistance.

The anhydride of o-ethylcarboxyl benzoic acid used in making the hydroxypropyl cellulose ester was made by reacting 1,302 parts of monoethyl phthalate of 96.7% purity with 396 parts of 95% acetic anhydride for 4 hours at 100° C. under vacuum in a still up to a kettle temperature of 100° C. under a pressure of 5 mm. of mercury, thus removing acetic acid and excess acetic anhydride, which were recovered. The anhydride of o-ethylcarboxyl benzoic acid remained as a still residue. In one run an ester-anhydride yield of 70.5% was secured, based upon the acetic acid recovered. The product was kept at —12° C. for about 16 hours, and filtered. The filtrate contained 79% of the anhydride of o-ethylcarboxyl benzoic acid.

*Example 17*

13.3 parts of an hydroxypropyl cellulose having a molecular weight of 176 on the basis of one glucose anhydride unit and containing 5% of moisture was leached with glacial acetic acid. The cellulose ether was pressed to a weight of 31.1 parts and reacted for 18 hours with a mixture totalling 237 parts of 3-butylcarboxyl propionic anhydride, 63.5 parts of acetic anhydride, 1.5 parts of 95% sulfuric acid and 1.0 part of 85% phosphoric acid, at temperatures of 21° C.-32° C. The resultant viscous dope was precipitated with isopropyl ether, and the precipitate successively extracted with isopropyl ether, hot methanol and boiling water until free from acidity. It was then dried to a weight of 24.8 parts and contained 1% moisture. The molar ratio of combined butylcarboxyl propionic acid to combined acetic acid in the cellulose mixed ester is at least 3.6:96.4.

The resultant cellulose ester was refluxed with an excess of ethanol containing some magnesium acetate, filtered, precipitated with hot water, washed and dried. The thus heat-stabilized ester contained 59% of combined organic acid, calculated as acetic acid. It fused at 180° C. in air; and was compression molded at 170° C. without the aid of any external plasticizer, yielding a light-colored, somewhat brittle article.

In the claims the terms "esterified carboxyl" and "acyloxy," respectively, are intended to designate the group —COOR wherein R is selected from the alkyl, aryl, aralkyl, cycloalkyl, alkoxyalkyl, aryloxyalkyl, alkoxyalkoxyalkyl and aryloxyalkoxyalkyl radicals.

We claim:
1. Process for producing mixed ester anhydrides of monocarboxylic acids, which comprises reacting acetic anhydride with a monoester of a dicarboxylic acid, said monoester containing only carbon and hydrogen in addition to the

groups, and removing acetic acid and unreacted acetic anhydride from the reaction mixture.

2. Process for producing mixed ester anhydrides of monocarboxylic acids, which comprises reacting acetic anhydride with a monoester of a dicarboxylic acid at an elevated temperature substantially below the boiling point of acetic anhydride under the pressure employed during the reaction, said monoester containing only carbon and hydrogen in addition to the

groups, and removing acetic acid from the reaction mixture.

3. Process for producing anhydrides of monocarboxylic acids having an esterified carboxyl group connected with a carbonyl carbon atom, which comprises reacting acetic anhydride with a monoester of a dicarboxylic acid at an elevated temperature substantially below the boiling point of acetic anhydride under the pressure employed during the reaction, said monoester containing only carbon and hydrogen in addition to the

groups, and removing acetic acid from the reaction mixture.

4. Process for producing anhydrides of monocarboxylic acids having an esterified carboxyl group connected with a noncarbonyl carbon atom, which comprises reacting acetic anhydride with a monoester of a dicarboxylic acid having an esterified carboxyl group connected with a non-carbonyl carbon atom at an elevated temperature substantially below the boiling point of acetic anhydride under the pressure employed during the reaction, said monoester containing only carbon and hydrogen in addition to the

groups, and removing acetic acid from the reaction mixture.

5. Process for producing ester anhydrides of monocarboxylic acids of the formula

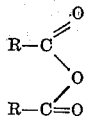

wherein each R designates a radical selected from the group consisting of the esterified (1) carboxyl, (2) carboxyalkyl, (3) carboxyalkenyl, (4) carboxycycloalkyl, (5) carboxyaryl and (6) carboxyaralkyl radicals, which comprises reacting acetic anhydride with a monoester of a dicarboxylic acid at an elevated temperature substantially below the boiling point of acetic anhydride under the pressure employed during the reaction, the ester group of the dicarboxylic acid monoester being selected from the alkyl, aryl, aralkyl, cycloalkyl, alkoxyalkyl, aryloxyalkyl, alkoxyalkoxyalkyl and aryloxyalkoxyalkyl radicals, and said dicarboxylic acid containing only carbon and hydrogen in addition to the

groups.

6. Process for producing anhydrides of monocarboxylic acids substituted on a non-carbonyl carbon atom by an esterified carboxyl group, which comprises reacting acetic anhydride with a monoester of an olefine dicarboxylic acid at an elevated temperature substantially below the boiling point of acetic anhydride under the pressure employed in the reaction, said monoester containing only carbon and hydrogen in addition to the

groups, and thereafter distilling the reaction mixture at a temperature and pressure facilitating vaporization and removal from the reaction mixture of acetic acid and any unreacted acetic anhydride.

7. The acid anhydrides of unsaturated monocarboxylic acids substituted on a non-carbonyl carbon atom by an esterified carboxyl group, said acid anhydrides containing only carbon and hydrogen in addition to the

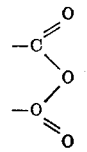

group and the two

groups.

8. Process for producing ester-anhydride products from the reaction of acetic anhydride and monoesters of dicarboxylic acids, which comprises reacting acetic anhydride with a monoester of a dicarboxylic acid, the monoester radical being selected from the class consisting of the alkyl, aryl, aralkyl, cycloalkyl, alkoxyalkyl, aryloxyalkyl, alkoxyalkoxyalkyl and aryloxyalkoxyalkyl radicals, and said dicarboxylic acid containing only carbon and hydrogen in addition to the

groups, at an elevated temperature substantially below the boiling point of acetic anhydride under the pressure employed in the reaction, and removing acetic acid and any unreacted acetic anhydride from the reaction mixture.

9. Process for producing ester-anhydride products from the reaction of acetic anhydride and monoesters of dicarboxylic acids, which comprises reacting acetic anhydride with a monoester of a dicarboxylic acid, the monoester radical being selected from the class consisting of the alkyl, aryl, aralkyl, cycloalkyl, alkoxyalkyl, aryloxyalkyl, alkoxyalkoxyalkyl and aryloxyalkoxyalkyl radicals, and the dicarboxylic acid having from two to ten carbon atoms and containing only carbon and hydrogen in addition to the

groups, at an elevated temperature substantially below the boiling point of acetic anhydride under the pressure employed in the reaction, and removing acetic acid and any unreacted acetic anhydride from the reaction mixture.

10. As a new compound, the anhydride of the monoethyl ester of endo-methylene hexahydrophthalic acid.

11. As a new compound, the anhydride of o-ethylcarboxyl benzoic acid.

12. As new compounds, the acid anhydride of acrylic acid substituted on a non-carbonyl carbon atom by —COOR group wherein R designates a radical of the class consisting of the alkyl, aryl, aralkyl, cycloalkyl, alkoxyalkyl, aryloxyalkyl, alkoxyalkoxyalkyl and aryloxyalkoxyalkyl radicals.

13. As new compounds, the acid anhydrides of 3-alkylcarboxyl acrylic acids.

14. As a new compound, the acid anhydride of 3-butylcarboxyl acrylic acid.

15. As a new compound, the acid anhydride of 3-isopropylcarboxyl acrylic acid.

16. As new compounds, the acid anhydrides of benzoic acid substituted on a non-carbonyl carbon atom by a hydrocarbon-substituted carboxyl group.

References Cited in the file of this patent

UNITED STATES PATENTS

| Number | Name | Date |
| --- | --- | --- |
| 2,032,679 | Wickert | Mar. 3, 1936 |
| 2,093,464 | Malm et al. | Sept. 21, 1937 |
| 2,171,791 | Kaase et al. | Sept. 5, 1939 |
| 2,306,095 | Valjavec | Dec. 22, 1942 |
| 2,322,783 | Katzman et al. | June 29, 1943 |
| 2,417,833 | Lincoln et al. | Mar. 25, 1947 |
| 2,581,814 | Plentl | Jan. 8, 1952 |
| 2,592,454 | Mowat et al. | Apr. 8, 1952 |

OTHER REFERENCES

Chem. Abst., vol. 2, page 995 (1908).

Houben: "Die Methoden der organischen Chemie" (publ. by Edwards Bros., Ann Arbor, Mich., 1943), pages 937 and 938.

Karrer: "Organic Chemistry" (2nd ed.), (Elsevier Publ. Co., New York; 1946), page 209.